Figure 1:
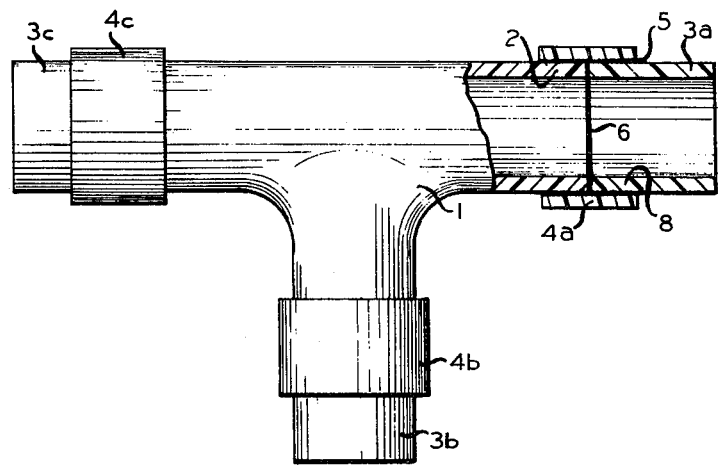

United States Patent [19]

Carrow

[11] 4,070,044
[45] Jan. 24, 1978

[54] POLYMER PIPE CONNECTION AND METHOD TO MAKE IT

[75] Inventor: Guy E. Carrow, Bartlesville, Okla.

[73] Assignee: Phillips Petroleum Company, Bartlesville, Okla.

[21] Appl. No.: 651,311

[22] Filed: Jan. 22, 1976

[51] Int. Cl.² .................. F16L 41/00; F16L 47/02
[52] U.S. Cl. .................................. 285/156; 156/86; 264/249; 285/155; 285/369; 285/381; 285/423; 285/DIG. 10; 526/348
[58] Field of Search ............... 285/381, DIG. 10, 423, 285/DIG. 16, 156, 155; 264/230, 249; 156/86, 245

[56] References Cited

U.S. PATENT DOCUMENTS

| | | | |
|---|---|---|---|
| 3,139,468 | 6/1964 | Wheat | 285/381 X |
| 3,291,670 | 12/1966 | Usab | 156/245 |
| 3,296,047 | 1/1967 | Parr | 264/230 X |
| 3,415,287 | 12/1968 | Heslop et al. | 285/381 X |
| 3,567,259 | 3/1971 | Benson et al. | 264/230 X |
| 3,582,457 | 6/1971 | Barthell | 156/86 X |
| 3,749,621 | 7/1973 | Shoffner | 156/86 |
| 3,847,694 | 11/1974 | Stewing | 285/381 X |
| 3,861,972 | 1/1975 | Glover et al. | 156/86 |
| 3,972,548 | 8/1976 | Roseen | 285/423 X |
| 3,975,039 | 8/1976 | Penneck et al. | 285/381 X |

Primary Examiner—Thomas F. Callaghan

[57] ABSTRACT

A pipe connection is provided which comprises two pipe ends, one inserted inside of the other, and one consisting essentially of crosslinked polymer material, whereas the other consists essentially of crosslinked or non-crosslinked polymer material, the connection having a layer of polymer material press-fitted and crosslinked between the two pipe ends. The pipe fitting is made by arranging the two pipe ends so that one is inserted in the other, one of the ends having a mechanical memory and having been deformed so that one of the pipe ends fits into the other, providing an in situ heat-crosslinkable polymer layer between the two pipe ends and heating the thus assembled pipe ends to crosslink the heat-crosslinkable layer, while the deformed pipe end returns towards its original shape, thus pressfitting the crosslinking polymer layer between the two pipe ends and making a strong, fluid-tight joint.

6 Claims, 3 Drawing Figures

POLYMER PIPE CONNECTION AND METHOD TO MAKE IT

This invention relates to pipe connections. In one of its more specific aspects, this invention relates to the connection of a crosslinked pipe end with a non-crosslinked pipe end or another crosslinked pipe end. A further aspect of this invention is a process for connecting incompatible pipe ends. A still further aspect of this invention relates to tape materials for connecting pipe ends.

BACKGROUND OF THE INVENTION

Compatible, non-crosslinked thermoplastic materials can usually be readily connected. Well-known techniques for this include joining respective sections by using adhesives and welding procedures. Pipe ends of crosslinked polymer, however, particularly of crosslinked polyolefins, are not readily joined by available techniques to each other or to pipe ends of non-crosslinked polymers. It would be desirable to have a process available for connecting pipe fittings made from crosslinked polyolefins with similar pipes or pipes made from non-crosslinked polyolefins.

THE INVENTION

It is one object of this invention to provide a new pipe connection.

Another object of this invention is to provide a process for making a pipe connection.

Still a further object of this invention is to provide means which can be used in said process for connecting an uncrosslinked pipe end with a crosslinked pipe end, rendering the connection both strong and fluid-tight.

Figure 2:
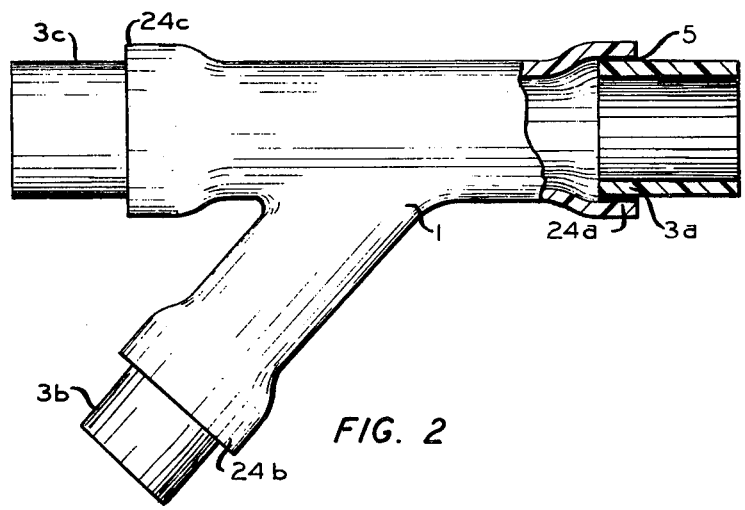
Figure 3:
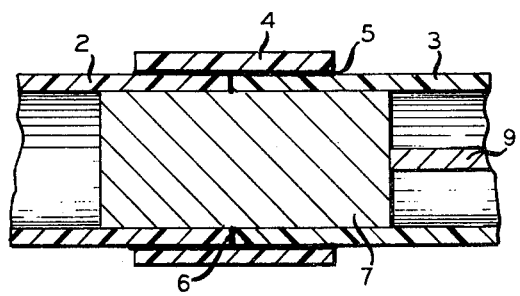

These and other objects, advantages, features, details and embodiments of this invention will become apparent from the following description of the invention, the attached claims and drawings in which FIG. 1 is a view of a T-shaped pipe connection piece partially in cross section, FIG. 2 is a view of a Y-shaped pipe connection piece partially in cross section, FIG. 3 shows a cross section to illustrate the pipe connecting process.

In accordance with this invention, I have now found that fluid-tight and strong connections between two pipe ends can be made by applying a layer of uncrosslinked but heat-crosslinkable polymer material between the two pipe ends, one of which is crosslinked and deformed, inserting one pipe end into the other and heating the crosslinked pipe end and the heat-crosslinkable polymer material such as to in situ crosslink this layer while press-fitted between the two pipe ends. The crosslinked pipe end during this heating and crosslinking of the polymer layer changes its shape due to a mechanical memory or plastic memory of this pipe end, thus squeezing the layer of crosslinking polymer material between the two pipe ends. Thus, in accordance with this invention, the connection between the two pipe ends is generated by the simultaneous effect of chemical crosslinking reaction and physical change of shape of at least one of the pipe ends.

More specifically, this invention resides in a pipe connection comprising a first pipe end of polymer material, a second pipe end of polymer material being inserted in said first pipe end, one of said first and second pipe ends consisting essentially of crosslinked polymer material, and a polymer layer press-fitted and in situ crosslinked between said first and said second pipe end. The press-fitting of the in situ crosslinking layer between the two pipe ends is achieved by the change of at least one of the pipe ends from a deformed towards a non-deformed shape due to the mechanical memory of this pipe end.

The pipe ends can be of any shape. The inside configuration of the first pipe end and the outside configuration of the second pipe end are similar. Preferably, the two pipe ends have cylindrical configurations. The size of the outside configuration of the second pipe relative to the size of the inside configuration of the first pipe before any deformation of these pipes has taken place is such that the second pipe end would not fit into the first pipe end with the in situ crosslinkable layer between them. Preferably, the outside diameter of the second pipe end in a non-deformed state is equal to or slightly larger than the inside diameter of the first pipe end before a deformation.

In accordance with a preferred embodiment of this invention, the polymer materials all are polyolefins individually selected from the polymers or copolymers of 1-olefins having 2–8 carbon atoms. Presently preferred are the polymers of ethylene, propylene, and butene-1, including the copolymers of ethylene and 1–8 mol % of butene-1 and the copolymers of ethylene and 1–8 mol % of hexene-1. The most preferred polymers are polyethylene and the copolymers of ethylene and butene-1, and of ethylene and hexene-1.

The crosslinkable polymer material of the layer between the two sections preferably is a polyolefin layer as defined above, having admixed therewith a crosslinking agent, which causes crosslinking of the polyolefin at elevated temperatures. Preferably, the crosslinking agent is selected from acetylenic dimethyl diperoxy hexynes having the formula

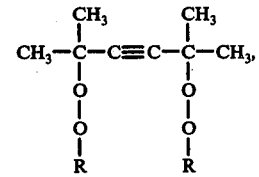

acetylenic dimethyl diperoxy octynes having the formula

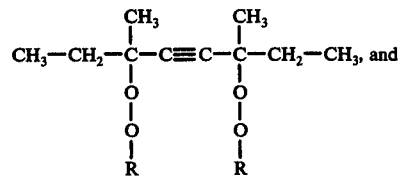

diacetylenic dimethyl diperoxy octynes having the formula

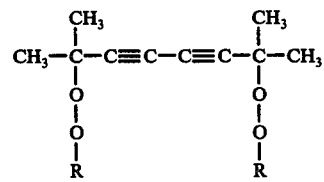

in which the radicals R, which can be the same or different, are individually selected from the group consisting of tertiary alkyl, alkyl carbonate and benzoate radicals. The alkyls in turn can be substituted, e.g., by halogen, particularly by chlorine. Examples for peroxides that can advantageously be used as crosslinking agents in admixture with polyolefins are 2,7-dimethyl-2,7-di(t-butylperoxy)octadiyne-3,5
2,7-dimethyl-2,7-di(peroxy ethyl carbonate)octadiyne-3,5
3,6-dimethyl-3,6-di(peroxy ethyl carbonate)octyne-4
3,6-dimethyl-3,6-di(t-butylperoxy)octyne-4
2,5-dimethyl-2,5-di(peroxybenzoate)hexyne-3
2,5-dimethyl-2,5-di(peroxy-n-propyl carbonate)hexyne-3
2,5-dimethyl-2,5-di(peroxy isobutyl carbonate)hexyne-3
2,5-dimethyl-2,5-di(peroxy ethyl carbonate)hexyne-3
2,5-dimethyl-2,5-di(alpha-cumyl peroxy)hexyne-3
2,5-dimethyl-2,5-di(peroxy beta-chloroethyl carbonate)hexyne-3
2,5-dimethyl-2,5-di(t-butylperoxy)hexyne-3.

The quantity of crosslinking agent in the layer of crosslinkable polymer material depends upon the desired properties. Usually about 0.25 to about 5.0 weight % of the above-identified crosslinking agents are mixed with the polyolefins to produce the material for the crosslinkable layer.

In accordance with one embodiment of this invention, the second pipe end is one end of a piece of non-crosslinked polyethylene pipe. The first pipe end is an end of a pipe fitting made from crosslinkable polyethylene material, e.g., by rotationally molding. Preferably, the pipe fitting at each one of its ends is provided with a non-crosslinked piece of pipe in the manner defined above.

In order to provide a pipe connection with a very smooth interior, it is presently preferred, in accordance with another embodiment of this invention, to attach a piece of non-crosslinked pipe to a crosslinked pipe end by means of a sleeve. The crosslinked pipe end and one end of the non-crosslinked piece of pipe are arranged inside of a plastic pipe sleeve having the layer of in situ crosslinked polymer material press-fitted between the sleeve and each one of these pipe ends. By using a piece of non-crosslinked pipe having the same internal diameter as the pipe end of crosslinked material, a very smooth interior of the pipe fitting is provided generating no additional turbulences in the flow of fluid through this pipe connection. It is again preferred that a pipe fitting of crosslinked material having a plurality of attachment ends is provided at each of the attachment ends with one piece of non-crosslinked pipe connected to the crosslinked pipe attachment end as described.

The sleeve or connector piece of pipe preferably consists essentially of crosslinked polyolefin having a mechanical memory.

The embodiment just described is further improved by a gasket of in situ heat-crosslinked polymer material between the abutting ends of the non-crosslinked pipe end and the crosslinked pipe end. The gasket is in situ crosslinked in the same manner as the layer between the sleeve and the two pipe ends.

In accordance with another embodiment of this invention, there is provided a process for connecting two pipe ends. In this process, at least the crosslinked polymer pipe end is mechanically deformed so that the first pipe end fits loosely inside of the second pipe end. The deformed pipe end has a mechanical memory. The second pipe end is arranged inside of the first pipe end with a layer of heat-crosslinkable polymer material between the two ends. Then the layer and the deformed end are heated while the deformed pipe end is caused to change its shape in the direction towards its undeformed shape, such as to squeeze said crosslinking layer between the first and the second pipe end. The preferred plastic materials for the pipe ends, and the preferred crosslinking agents, are the same as those disclosed and defined above in connection with the pipe connection itself.

The deforming step and the causing of the deformed polymer pipe end to change back towards its original shape can be carried out in different manners. The polymer pipe end can be deformed by cold-swaging it, i.e., by pressing the pipe end into a die and deforming it without applying heat. The cold-swaged pipe end and the other pipe end then are arranged one inside the other and the cold-swaged pipe end recovers towards its original shape without the application of heat. The application of heat in this case in order to crosslink the in situ heat-crosslinkable layer accelerates this recovery. Another embodiment, which is presently preferred, consists in deforming one polymer pipe end of crosslinked polymer using heat and pressing the heated pipe end into or over a die. The pipe end is then cooled while still in or on the die, thus quasi-freezing the deformation. Then the deformed pipe end and the other pipe end are assembled with the layer of heat-crosslinkable material between them. By applying heat, both the crosslinking of the intermediate polymer layer is achieved and the change of shape of the deformed polymer pipe end towards its undeformed state is caused. It is also possible to employ both procedures just described, each on one pipe end. Instead of using a die, the deformation of one of the polymer sections can also be achieved by applying gas pressure to one side thereof.

Either one of the two pipe ends can be deformed in order to achieve the change of shape during the production of the pipe connection described. It is, however, presently preferred to widen the first polymer pipe end and to apply the layer of in situ heat-crosslinkable polymer onto the outside configuration of the second pipe end. The latter can be done by applying crosslinkable polymer powder to the outside configuration, e.g., by dipping the pipe end into a container filled with powder of such crosslinkable material. In another embodiment, a tape of crosslinkable polymer material is wound around the outside configuration of the second pipe end.

Both the tape just mentioned and the annular gasket described above, to be arranged between the abutting ends of two pipes, are made of crosslinkable polyolefins by compression molding or extrusion at temperatures below the crosslinking temperature. The gasket and the tape can be 1 mil to 30 mils (0.00254 to 0.0762 cm) thick.

For the pipe connection described above involving a joining polymer pipe shaped as a sleeve, it is convenient and presently preferred to use a crosslinked joining polymer pipe, to heat it until it is softened sufficiently to be expanded on a tapered mandrel and thereafter allowed to cool on the mandrel, thus quasi-freezing the deformation. The joining polymer pipe thereafter is removed from the mandrel and ready to be used in the connection process. Upon heating, the joining polymer pipe softens again and shrinks back towards its original shape due to its mechanical memory, squeezing the crosslinking layer between the sleeve and the respective pipe ends.

The pipe joint thus can be made in accordance with this invention by positioning two pipes on a support with their ends abutting. An annular gasket of non-crosslinked polymer containing a crosslinking agent and thus being crosslinkable is placed between the abutting pipe ends. A tape of similar or the same material, namely of in situ crosslinkable polymer material, is applied around the two pipe ends that face each other. A crosslinked sleeve having an internal diameter slightly smaller than the external diameter of the two pipe ends to be joined is heated, deformed and cooled as described above. This sleeve is then positioned over the two abutting pipe ends. The joint section with the sleeve thereafter is heated to a temperature at which the sleeve shrinks in a direction towards its original shape, and at which the annular gasket and the layer of in situ heat-crosslinkable tape are crosslinked. Thereby, a strong and fluid-tight bond between the two pipe ends is made.

In order to prevent a collapsing of pipe ends and particularly when pipes with thin walls are connected, a supporting metal plug is inserted into the joint section. This supporting plug has approximately the same external diameter as the internal diameter of the pipes to be connected. The plug prevents the pipe ends from collapsing when heat is applied and the sleeve shrinks around the pipe ends. After the joint has been cooled, the plug is removed.

Another embodiment of this invention consists of a means to connect a crosslinked pipe end either to another crosslinked pipe end or to a non-crosslinked pipe end. This means is a flexible tape consisting essentially of non-crosslinked but heat-crosslinkable polyolefin. The tape preferably consists of a mixture of the preferred polyolefins defined above and a crosslinking agent as defined above. The tape can be prepared by extruding the mixture of the polyolefin and the crosslinking agent at a temperature below that at which a significant crosslinking occurs through a ribbon or sheet die.

The flexible tape advantageously is in the shape of a roll of tape and preferably has one tacky side. Thus, the tape can be readily applied to, e.g., a polyolefin pipe end by wrapping it around this end. During the pipe connection process described above, this tape is squeezed between the two pipe ends, crosslinked and formed a mechanically strong and fluid-tight connection between the respective two pipe ends.

The invention will be still more readily understood from the following description of the drawing.

FIG. 1 shows a T-shaped pipe connection. To a pipe fitting 1 of crosslinked high-density polyethylene, three pieces of pipe 3a, 3b and 3c of non-crosslinked, high-density polyethylene are attached. The strong and fluid-tight connection is achieved by three sleeves 4a, 4b and 4c that previously had been heat-expanded over a mandrel and cooled on the mandrel, and then assembled over the joint section of the attachment ends 2 of the pipe fitting 1, and the ends of the non-crosslinked pipes 3a, 3b and 3c facing the attachment ends 2. Between the sleeves 4a, 4b and 4c and the attachment ends 2 of the pipe fitting 1, as well as the ends 8 of the non-crosslinked pipes 3a, 3b and 3c, a layer of in situ heat-crosslinkable polymer material 5 is arranged. Furthermore, between the abutting faces of the pipe ends 2 and 8, an annularly shaped gasket 6 of in situ heat-crosslinkable polyolefin is arranged. The free ends of the pieces of pipe 3a, 3b and 3c can be readily connected to other non-crosslinked polyolefin pipes by standard welding techniques.

The Y-shaped pipe connection shown in FIG. 2 is similar to the connection of FIG. 1. However, instead of sleeves 4a, b and c, the ends 24a, b and c of the crosslinked high density polyethylene pipe fitting 1 have been deformed by pressing it over a mandrel. Those ends were then arranged over the ends of the pieces of pipe 3a, 3b, and 3c, respectively with the layers 5 of in situ heat-crosslinkable material as an intermediate layer. The heating of the joints from the outside caused recovery of the deformed ends 24a, b and c, squeezing the layer of crosslinking material 5 between the ends 24a, b and c, and 3a, b and c of the crosslinked and respectively, non-crosslinked pipe ends.

In FIG. 3, finally, a step of the process for making pipe connections is illustrated. During the heating step of joints as described in connection with FIGS. 1 and 2, and in particular when pipe ends with thin walls are connected, it is desirable to support the pipe ends. For this purpose, advantageously a plug 7 is inserted into the joint section. The axial length of this plug 7, which has the same outside configuration as the inside configuration of the pipes to be joined, is longer than the area in which the pipe ends 2 and 3 are being softened. The plug 7 consists of, e.g., steel and is withdrawn from the joint using shaft 9 to pull it back out when the temperature of the joint has sufficiently fallen below the softening point of the materials.

The invention and particularly the process for making the plastic article will be still more readily understood from the following example.

EXAMPLE

In this example, a piece of non-crosslinked polyethylene pipe was attached to one attachment end of a T-shaped pipe fitting of crosslinked polyethylene. The T-shaped fitting had an 8-inch (20 cm) long cylindrical attachment end of 2-inch internal diameter. The fitting was made by rotational molding from a crosslinkable polyethylene homopolymer having a density of 0.965 g/cc, a melt index of 30 g/10 min. and containing 0.75 weight % of 2,5-dimethyl-2,5-di(t-butylperoxy)hexyne-3. A piece of 8-inch (20 cm) length of a non-crosslinked plastic pipe made by extrusion from an ehtylene-butene-1 copolymer and having a density of 0.955 g/cc and a melt flow of 1.5 g/10 min. was used to attach to the fitting described. The non-crosslinked pipe had an internal diameter of 2 inches (5 cm). A section of 6 inches (15 cm) of a crosslinked section of pipe made from the same material as the crosslinked fitting described above, and also having an internal diameter of 2 inches (5 cm) was used as the sleeve (see 4a, 4b and 4c in FIG. 1). The wall thickness of all the sections was about ¼ inch (0.6 cm). Furthermore, a piece of non-crosslinked, compression-molded film of 20 mils (0.5 millimeter) thickness containing a crosslinking agent was used. The film consisted of the same mixture of polyolefin and a crosslinking agent as the material from which the T-shaped fitting had been rotationally molded.

The 6-inch-long piece of crosslinked pipe was heated to a temperature of about 350° F (177° C), at which the crosslinked pipe softened. The pipe was then expanded over a mandrel so that its internal diameter was sufficiently above the external diameter of the uncrosslinked pipe and the attachment end of the fitting to fit over these pipe ends and the film of crosslinkable polyethylene. The crosslinked pipe was actually widened by ⅜ inch to an internal diameter of about 2⅜ inches. Then the sleeve was allowed to cool, thus quasi-freezing the deformation. The deformed sleeve was then removed from the mandrel.

A gasket ring of the film material described above was cut and placed between the abutting pipe ends. A strip of the crosslinkable film material was wrapped around the periphery of the crosslinked attachment end and the non-crosslinked pipe end. Then the expanded sleeve was slipped over the joining section and the entire assembly was placed in a holder. The assembly then was arranged on a roller platform rotating at about 30 rpm and exposed to an infrared heater for about 10 min. This was sufficient to heat the sleeve to about 400° F (204° C) and also to heat the film above the activation temperature for the crosslinking. The sleeve shrank back towards its original diameter and tightly around the pipe sections. The crosslinkable film softened and crosslinked, providing a water- and air-tight seal. Pressure testing showed that the joint was stronger than the non-crosslinked polyethylene pipe section alone.

Reasonable variations and modifications, which will be apparent to those skilled in the art, can be made in this invention without departing from the spirit and scope thereof.

I claim:

1. A modified multiple-outlet pipe fitting which comprises
   a. a base pipe fitting formed of a crosslinked polymer and having at least three outlets,
   b. at least three segments of conduit having a first end and a second end and being formed of a non-crosslinked polymer, so positioned that each first end of each segment of conduit is positioned adjacent one outlet of said base fitting and wherein each segment of conduit is essentially of the same internal diameter as that outlet of said base fitting to which it is positioned adjacent,
   c. a heat-deformed sleeve member disposed around each of said outlets of said base fitting and said first end of each segment of conduit, each said member having been formed from a heat-deformable polymer and being sealably connected to each said fitting outlet and segment of conduit by
   d. a seal formed of an in situ crosslinked polymer material having been disposed between the inner surface of each sleeve member and the outer surface of each outlet of said base fitting and each first end of each segment of conduit abutted thereto.

2. A modified fitting according to claim 1 wherein said in situ crosslinked polymer material is further disposed between the abutting surfaces of said outlets and said first ends of said conduits so as to form a gasket member between same.

3. A modified fitting according to claim 1 wherein said polymers are individually selected from the group consisting of homopolymers and copolymers of 1-olefins having 2 to 8 carbon atoms.

4. A modified fitting according to claim 3 wherein said polymers are individually selected from the group consisting of polyethylene, polypropylene, polybutene-1, and copolymers of ethylene with 1 to 8 mol percent of 1-butene, and copolymers of ethylene with 1 to 8 mol percent of 1-hexene.

5. A modified fitting according to claim 1 wherein said seal was formed from a non-crosslinked but heat-crosslinkable polyolefin.

6. A modified fitting according to claim 5 wherein said seal was formed from a mixture consisting of polyolefin and an acetylenic diperoxy hydrocarbon crosslinking agent.

* * * * *